United States Patent [19]

Aoshima et al.

[11] Patent Number: 4,796,992

[45] Date of Patent: Jan. 10, 1989

[54] APPARATUS FOR OPTICALLY ANALYZING AN OBJECT USING FOUR-WAVE MIXING TECHNIQUE

[75] Inventors: Shinichiro Aoshima; Yutaka Tsuchiya, both of Shizuoka, Japan

[73] Assignee: Hamamatsu Photonics Kabushiki Kaisha, Shizuoka, Japan

[21] Appl. No.: 131,404

[22] Filed: Dec. 10, 1987

[30] Foreign Application Priority Data

Dec. 11, 1986 [JP] Japan ............................ 61-293538
Dec. 19, 1986 [JP] Japan ............................ 61-302912

[51] Int. Cl.⁴ .................................... G01B 9/027
[52] U.S. Cl. ............................ 356/347; 356/348; 356/376
[58] Field of Search ................. 356/347, 348, 376

[56] References Cited

U.S. PATENT DOCUMENTS 4,442,455 4/1984 Haignard et al. ............... 356/347 X Primary Examiner—Davis L. Willis
Assistant Examiner—Matthew W. Koren
Attorney, Agent, or Firm—Finnegan, Henderson, Farabow, Garrett, & Dunner

[57] ABSTRACT

An apparatus for optically observing a wavefront from an object on real-time basis to determine an optical characteristic of the object and observing two-dimensional images at positions taken in the direction of the depth of a three-dimensional object, that is, equidistant images on real-time basis, using four-wave mixing technique.

15 Claims, 7 Drawing Sheets

APPARATUS FOR OPTICALLY ANALYZING AN OBJECT USING FOUR-WAVE MIXING TECHNIQUE

BACKGROUND OF THE INVENTION

The present invention relates to an apparatus for optically analyzing wavefronts of light and forming two-dimensional images at some positions taken in the direction of the depth of a three-dimensional object, i.e., equidistant images on real-time basis, using phase conjugate waves.

In Applied Optics, Vol. 22, No. 2, pp. 215–232 published on Feb. 15, 1983, Nils Abramson reported that light wavefronts were recorded and recreated on a hologram, using coherent laser beam pulses of a quite short pulse duration.

FIG. 1(A) is a schematic diagram of an apparatus for recording light wavefronts by means of holography. Some of the light emitted from a laser L passes through a spatial filter A to an observed point C on an object O, and reflected therefrom to a point B on a hologram plate H to form object waves. Another portion of the light passes through the spatial filter A, mirrors E and D to the point B to form reference waves. The object waves and the reference waves interfere with each other. As a result interference fringes are formed on a recording surface that is, the hologram plate H, and then it is developed to complete phologrphy. If the laser beam produced by the laser L has a short coherence length or takes the form of short pulses, and an object O of interest is a whitepainted door having a reflecting matter (M) such as a mirror thereon as shown in FIG. 1(B), it is possible to record and recreate the light wavefronts themselves, unlike holograms.

Particularly, using the aforementioned light source, only those light rays which are passed through the points A, E, D, B and the points A, C and B respectively and which have the difference of their optical paths within the coherence length of the pulse duration interfere with each other on the surface H. Those light rays which differ in optical length over the coherence length of the pulse duration do not form interference fringes.

More specifically, object waves arriving at $e_o$ on the object o form interference fringes only at point $h_o$ on the surface H. Similarly, object waves arriving at $e_1$ and $e_2$ produce interference fringes only at $h_1$ and $h_2$, respectively. The hologram created in this way is developed and illuminated with only the reference waves, which are then diffracted by the interference fringes recorded in each portion on the hologram H. Thus, the light used to form the interference fringes is recreated. The observing point is moved along the surface H to observe time-variation of the light wavefronts as shown in FIG. 2. FIG. 2 is a diagram showing the photographs taken during the reconstruction of one single hologram plate. In FIG. 2, O and W represent an object door and a light reflected by a mirror on the object, respectively. As described above, a wavefront can be observed by combining an interference property of a laser light having a short coherence length or a short pulse width with a conventional holograph technique.

Furthermore, if the wavefront observing technique as described above is applied to a three-dimensional object observing technique for three-dimensionally observing an object, for example, plural equidistant images of the three-dimensional object can be observed. Such a technique for forming equidistant images that is, three-dimensional images from a three-dimensional object will be described in detail with reference to FIGS. 3, 4, 5 and 6.

It is generally known that two laser beams produced from a laser interfere with each other only if their optical paths are substantially the same. This principle is next described briefly in connection with a Michelson interferometer shown in FIG. 3.

Referring to FIG. 3, a laser 50 produces a laser beam P1 which is divided into a laser beam P2 and a second laser beam P3 by a half mirror 51. The beams P2 and P3 proceed to mirrors 52 and 53, respectively. The beam P2 is reflected by the mirror 52 and returns to the half mirror 51. Similarly, the beam P3 is reflected off the mirror 53 and goes back to the half mirror 51. The two laser beams P2 and P3 returning to the half mirror 51 form a composite light P4 which is then detected. Assuming that the mirrors 52 and 53 are spaced at the distances L1 and L2, respectively, from the half mirror 51. The difference in optical path between the laser beams P2 and P3 which is created in making one reciprocation is given by $$\Delta l = 2 \times |L1 - L2|$$

One laser beam lags the other by the amount given by $$\tau = \Delta l / C$$

where C is the light velocity.

Referring next to FIG. 4, the laser beam produced takes the form of a pulse having a given duration of $\Delta t$. If the time interval $\tau$ between the two laser beams P2 and P3 is larger than the duration $\Delta t$, then one of them reaches the half mirror 51 before or after the other arrives at the half mirror 51. At this time one beam cannot interfere with the other and so no interference is found in the composite light P4. In order to produce interference, the optical-path difference $\Delta l$ between the laser beams P2 and P3 must be less than $C\Delta t$. Where the laser beam takes the form of short pulses, the duration $\Delta t$ is quite short, and therefore, interference takes place only when the optical-path difference $\Delta l$ is quite small. The maximum possible value of $\Delta l$, i.e., $C\Delta t$, at which interference occurs is known as the coherence length. In other words, shorter laser beam pulses have shorter coherence lengths.

FIG. 5 shows an apparatus for forming equidistance images from a three-dimensional object, for example, a propeller as shown in FIG. 5, using the shorter laser beam pulses an described above. This apparatus includes a laser 61 for producing an object beam toward a three-dimensional object, for example, the propeller 60 of a blower as well as a reference beam, a photographic dry plate 62 for recording the interference fringes of the object beam reflected by the propeller 60 and the reference beam, and two mirrors 63 and 64 for guiding the reference beam from the laser 61 to the plate 62.

The laser beam from the laser 61 is caused to extend over an angle of $\theta$. One portion of it is incident to the propeller 60 as an object beam, while the remaining portion is incident upon the mirror 63 as a reference beam. The object beam incident upon the propeller 60 is reflected by the propeller and reaches the dry plate 62. The reference beam incident upon the mirror 63 travels to the dry plate 62 through the mirrors 63 and 64.

Interference fringes are produced on the photographic plate 62 in this way only when the difference in optical path between the object beam and the reference beam is less than the coherence length determined by the duration of the laser beam.

In the structure shown in FIG. 5 the reference beam reaches at a recording position H1 on the plate 62 after traveling the shortest optical length. Therefore, the beam which interferes with this reference beam is limited to the object beam traveling from a position S1 taken in the direction of the depth of the propeller. Likewise, the beams that interfere with the reference beams arriving recording positions H2 and H3 on the photographic dry plate 62 are restricted to the object beams traveling from positions S2 and S3 taken in the direction of the depth of the propeller 60. In this way, interference fringes which are formed by the interference of the reference beam with the object beams traveling from the positions S1, S2, S3 are recorded at positions H1, H2, H3, respectively, on the photographic plate 62.

The interference fringes recorded at the positions H1, H2, H3 on the photographic plate 62 are developed to create a hologram. When this hologram is illuminated with only the reference beam, only the object beams reflected from the positions S1, S2, S3 are recreated from the recording positions H1, H2, H3 on the interference fringes. Consequently, it is possible at a position B1 to observe an image formed by the object light traveling from the position S1. The images based upon the object beams originating from the positions S2 and S3 taken in the direction of the depth of the propeller 60 can be successively observed by shifting the position at which the observation is made to positions B2 and B3 one after another.

FIGS. 6(A) and 6(B) show images of the propeller 60 recreated by installing a camera (not shown) at observational positions B1 and B2, respectively, and taking pictures. As can be seen from these figures, equidistant images at the position S1 can be observed as recreated images at the observational position B1. Equidistant images at the position S3 can be observed as reconstructed images at the position B3.

The conventional apparatus as described above utilizes a holography technique, so that the interference fringes recorded on the photographic plate 62 must be developed to create holograms. Further, the holograms must be illuminated again with the reference beam to recreate images. Thus a considerable amount of labor is needed to observe a wavefront and equidistant images with a wavefront observing technique and it is impossible to observe the wavefront and the equidistant images on a real-time basis.

SUMMARY OF THE INVENTION

An object of the present invention is to provide an apparatus for optically analyzing a light wavefront from an object to determine an optical characteristic of the object on real-time basis, using four-wave mixing technique.

Another object of the present invention is to provide an apparatus for optically analyzing two-dimensional images at positions taken in the direction of the depth of a three-dimensional object, that is, equidistant images on a real-time basis, using the basical principle of observing the light wavefront as described above.

The apparatus for optically analyzing an object using four-wave mixing technique according to this invention comprises a laser source for producing a pulse beam; a nonlinear optical element for producing a phase conjugate wave according to an incident beam thereon; a beam splitting means for splitting the pulse beam into first and second pulse beams; a first guide means for guiding the first pulse beam to enter the nonlinear optical element, the first pulse beam serving as a reference beam and being splitted into two beams having the substantially same optical length, one of which enters said nonlinear optical element from a first direction and the other of which enters from a second direction opposite to the first direction; a second guide means for guiding the second pulse beam to enter an object as an object beam; a third guide means for guiding said object beam from the object to enter the nonlinear optical element; an image observing means for forming an image of the phase conjugate wave from the nonlinear optical element; and a fourth guide means for projecting said phase conjugate wave from the nonlinear optical element on the input end of the image observing means, wherein the object beam has the substantially same optical length as the reference beam.

The variable delay system is included in either the first or the second guiding means to change the difference in optical path between the reference and object beams incident upon the nonlinear optical element, thereby to observe the variation of a wavefront and an equidistant images of the three-dimensional object with respect to time.

DETAILED DESCRIPTION OF THE INVENTION

The present invention will be hereinafter described in more detail with reference to the drawings.

Figure 7:
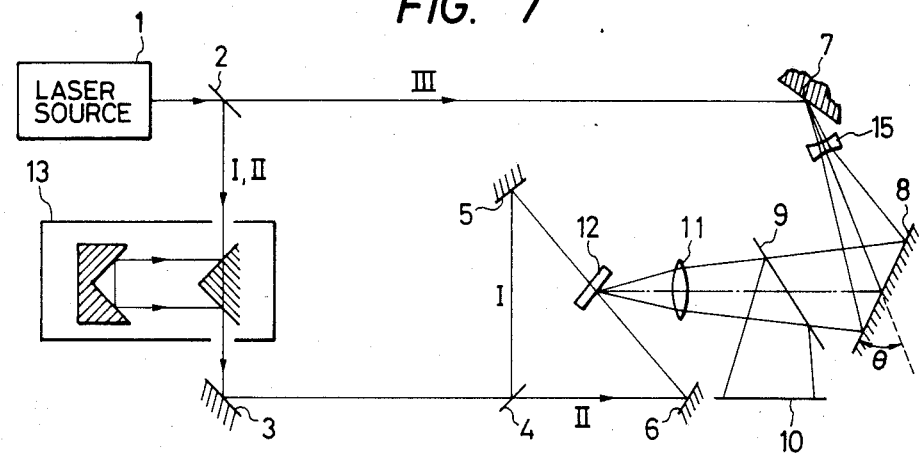
FIG. 7 is a block diagram of an apparatus for observing wavefronts of light according to this invention.

FIG. 7 is a plan view of an apparatus for observing a wavefront light according to this invention. A light source 1 produces light pulses of a quite short duration. These pulses are split by a beam splitter 2 into two beams one of which travels in a first geometrical path I or a second geometrical path II, the other propagating in an observed wavefront geometrical path III. The light source 1 comprises a laser source for producing a laser pulse beam having a pulse width of the order of several picoseconds, or below several picoseconds such as a CPM ring dye laser capable of producing optical pulses of 100 fs or the like. The pulses reflected by the beam splitter 2 into the first path I an the second path II are caused to impinge on a variable delay system 13 that can change the optical path. The pulses transmitted through the delay system 13 are divided by a half mirror 4 into one beam traveling in the first path I an the other beam propagating in the second path II.

The optical pulse reflected by the half mirror 4 is reflected by a mirror 5 disposed in the first path I and then enters a nonlinear optical element 12 from one direction. The light transmitted through the half mirror 4 is reflected by a mirror 6 disposed in the second path II and then enters the optical element 12 from the opposite direction. The optical element 12 is disposed between the mirrors 5 and 6.

The traveling distance of the beam propagating from the half mirror 4 to the nonlinear optical element 12 in the path I is made equal to that of the beam propagating from the half mirror 4 to the element 12 in the path II. The triangular mirror configuration formed by the half mirror 4 and mirrors 5, 6 can take any desired form, as long as the geometrical paths I and II are identical in optical path an the beams enter the nonlinear optical element 12 from opposite directions to each other.

The nonlinear optical element 12 comprises crystalline barium titanate ($BaTiO_3$). It is also possible to fabricate the element from a thin film of a dye such as eosin Y. The first geometrical path I is defined herein as a course which includes the beam splitter 2, the variable light delay system 13, the mirror 3, the half mirror 4, the mirror 5, and the nonlinear optical element 12 and which permits a beam to travel so as to pass through these elements in this order. The second geometrical path II is defined as a course which includes the beam splitter 2, the variable light delay system 13, the mirror 3, the half mirror 4, the mirror 6, and the nonlinear optical element 12 and which enables a beam to travel so as to pass through these elements in this order.

The optical pulses of the quite short duration which are transmitted through the beam splitter 2 travel an observed wavefront geometrical path III and enter the nonlinear optical element 12. The path III includes the mirror 7, a concave lens 15 (an object), a plane plate 8, the half mirror 9, a lens 11, and the nonlinear optical element 12. the path permits a beam to travel therein so as to pass through these elements in this order. The concave lens 15 varies its input wavefront and forms a wavefront to be observed.

The plane plate 8 disposed in the path III forms a diffusive reflecting surface. The path III is once widened by the concave lens 15. The light traveling in this path is reflected by the plane plate 8 disposed at an angle to the optical axis. Therefore, the geometrical path III includes various optical paths. Only when a beam enters the nonlinear optical element 12 after traveling over the same optical length as the first and second geometrical paths I and II, phase conjugate waves propagating in the opposite direction to the incident beam are produced by four-wave mixing.

The phase conjugate wave is obtained by inverting, in time, the object beam which is incident upon the nonlinear optical element 12 and interfers with the reference beam and by reflecting it along the incident geometrical path. This phenomenon was proved by Zeldovich et al. of P. N. Lebedev Physics Laboratory, Moscow, in 1972.

The four-wave mixing means a mechanism by which phase conjugate waves of the incident object beam are produced by the interaction among the four beams, i.e., three incident beams (one object beam and two reference beams) and one reference beam in a nonlinear medium, the reflected beam changing into the phase conjugate waves.

As mentioned previously, the phase conjugate waves are generated only when light impinges on the nonlinear optical element 12 simultaneously with optical pulses which enters the nonlinear optical element 12 after traveling in the first or second path I or II. The conjugate waves are reflected by the half mirror 9 and projected onto a screen 10. In this way, an image of a light wavefront is projected on the screen on a real-time basis.

Several phase conjugation mechanisms have been theoretically proposed, an d particularly two mechanism thereof will be described hereinafter.

Figure 8:
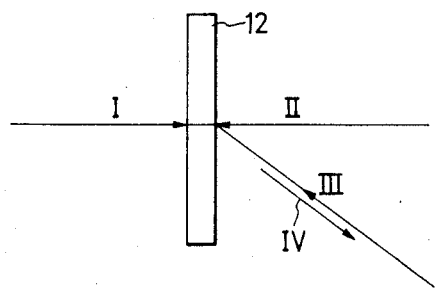
FIG. 8 is a schematic representation for illustrating the principles of degenerate four-wave mixing.

Referring to FIG. 8, a phase conjugate wave is produced by degenerate four-way mixing in the manner described below.

As described above, the first geometrical path I and the second geometrical path II have the same optical path. Optical pulses produced by the pulsed laser 1 follow these paths and enter the nonlinear optical element 12 simultaneously from opposite directions. Those optical pulses which enter the element simultaneously with the aforementioned optical pulses originating from the same light source after passing the path III are reflected by a transient diffraction grating produced inside the nonlinear optical element 12 by the light entering through the first and second paths. Then, a phase conjugate wave propagating in the opposite direction to the path III is produced and directed into a geometrical path IV. As a result, an image of certain light waves is produced on the screen 10. In this example, the geometrical path IV comprises the nonlinear optical element 12, the lens 11, the half mirror 9, and the screen 10. Light traveling in this path passes through these elements in this order.

Another mechanism of the four-wave mixing is described briefly by contrast with the conventional holography. The nonlinear optical element 12 corresponds to the photographic dry plate on which interference fringes are recorded. Interaction between the object beam and one reference beam, for example the reference beam reflected by the mirror 5, incident upon the nonlinear optical element 12 forms interference fringes which are a series of light and dark bands within the nonlinear optical element 12. The fringes correspond to the hologram. However, the four-wave mixing does not require that the photographic plate be developed. In the four-wave mixing method, recording and development are carried out simultaneously, and one corresponding to a hologram is produced in the nonlinear medium on a real-time basis, unlike the prior art holography. This hologram created in the nonlinear medium on a real-time basis is illuminated with the other reference beam, for example the reference beam reflected by the mirror 6. This reference beam is reflected as phase conjugate eaves by the hologram created on a real-time basis. The conjugate waves produce images recreated by the real-time hologram. Only those incident object waves which have substantially the same optical path as the reference waves contribute to the formation of a hologram. That is, those object waves which make with the reference waves optical-path differences less than the coherence length determined by the duration of the laser beam contribute to interference. Also, it can be said that since two reference beams are exactly the same except that they propagate in opposite directions, the object beam interferes with the reference beam reflected off the mirror 6 to form a real-time hologram within the nonlinear medium, and that phase conjugate waves are delivered by the reference beam reflected by the mirror 5. In any case, these four waves are mixed together simultaneously and so that object beam incident upon the nonlinear optical element 12 makes substantially no time difference with its phase conjugate waves.

The operation of an apparatus for observing a wavefront of light according to one aspect of this invention will be described in detail hereinafter. Those optical pulse which are transmitted through the beam splitter 2 and broadened by the concave lens 15 and hit the plane plate 8 obliquely. The pulses are scattered on the plate. A single pulse of a quite short duration first enters the portion of the plane plate 8 which is closest to the lens 11. Then, those portions which are remoter from the lens 11 are successively illuminated. Therefore, the instant at which the plane plate 8 is illuminated differs from location to location.

Figure 9:
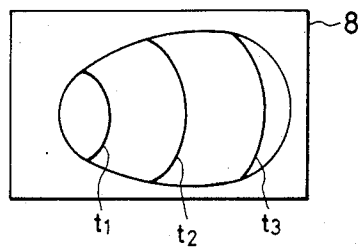
FIG. 9 is a schematic view shown cross-sectional images of wavefronts formed on a plane plate at certain instants of time.

FIG. 9 is a schematic representation, for illustrating the positions illuminated at certain instants of time. It is assumed that optical pulses produced by the pulsed laser 1 at time 0 arrive at different portions of the plane plate 8 at times $t_1$, $t_2$, $t_3$, respectively, as shown in FIG. 9. The concave lens 15 is located to the left in FIG. 9. Light waves scattered by the plane plate 8 successively at the times $t_1$, $t_2$, $t_3$ are transmitted through the half mirror 9. Then, the waves are converged by the lens 11, and enter the nonlinear crystal 12 successively at times $t_1'$, $t_2'$, $t_3'$.

Figure 10:
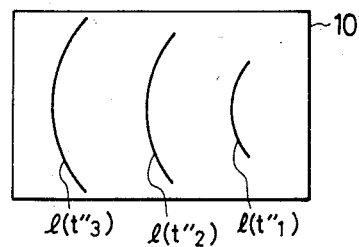
FIG. 10 is a schematic view of recreated images of light wavefronts.

Assuming that lights passed through the paths I and II reach the nonlinear crystal 12 at the time $t_1'$, the light reflected by the plane plate at the time $t_1$ and the lights passed through the paths I and II produce a phase conjugate wave by the above-described degenerate four-wave mixing. The conjugate wave travels in the path IV and arrives on the screen 10 at a time $t_1''$. Under the aforementioned conditions, an image $l(t_1'')$ of a wavefront appears on the screen 10, as shown in FIG. 10. The plane plate 8 is disposed to the left in FIG. 10. The images shown in FIG. 10 are obtained by making observations from the side of the half mirror 9. It is to be noted that any image of wavefront other than $l(t_1'')$ does not appear on the screen 10 at this time.

Lights passed through the paths I and II reach the nonlinear crystal 12 at the time $t_2'$. The light reflected by the plane plate at the time $t_2$ and the light passed through the paths I and II develop a phase conjugate wave by the aforementioned degenerate four-wave mixing. At this time, the variable light delay system 13 is adjusted to greatly increase the optical lengths of the geometrical paths I and II. Similar advantages can be obtained by inserting the variable light delay system 13 in the observed wavefront path III, for example between the beam splitter 2 and the mirror 7.

The phase conjugate wave follows the path IV and arrives on the screen 10 at the instant $t_2''$. As a result, an image $l(t_2'')$ of a wavefront appears on the screen 10 as shown in FIG. 9.

Similarly, if lights transmitted through the paths I and II reach the nonlinear crystal 12 at the time $t_3'$, then an image $l(t_3'')$ of a wavefront appears on the screen 10 at the time $t_3''$.

As shown in FIG. 7, the plane plate is disposed at angle $\theta$ to the optical axis of the center of the light beam transmitted through the beam splitter 2. Therefore, the recreated wavefront on the screen 10 placed vertical to the optical axis of the phase conjugate wave reflected by the half mirror 9 is a cross section taken along a surface inclined at the angle $\theta$.

In the embodiment described above, wavefronts can be observed on a real-time basis. Further, by scanning the beam or moving the concave lens, the optical characteristics of the whole wavefront-modifying optical element, for example, the concave lens 15 can be measured. Examples for observing a wavefront modified by, for example, the whole concave lens will be next described with reference to FIGS. 11–15.

Figure 11:
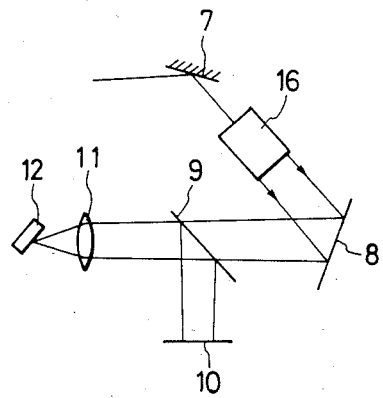
FIG. 11 is a schematic diagram of the apparatus for observing wavefronts of light using a beam expander invention.
Figure 12:
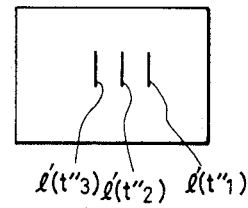
FIG. 12 is a schematic view of images of wavefronts recreated by the apparatus shown in FIG. 11.

As shown in FIG. 11, a beam expander 16 is inserted between the mirror 7 and the plane plate 8 of the apparatus. The observed wavefronts are modified as shown in FIG. 12 by adjusting the variable delay system in the same manner as in the previous example.

Figure 13:
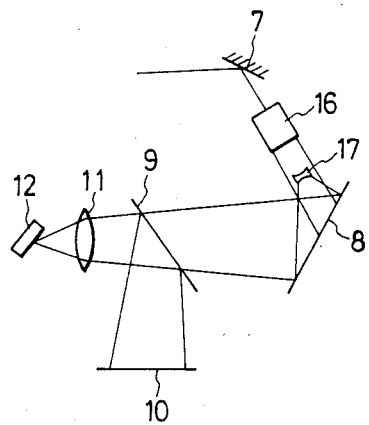
FIG. 13 is a schematic diagram of the apparatus as shown in FIG. 11 according to the invention in which wavefronts created by a concave lens are observed.

After the completion of the adjustment described above, a concave lens 17 that is a wavefront-modifying optical element is inserted between the beam expander 16 and the plane plate 8 as shown in FIG. 13 and the variable delay system is adjusted, whereby it is possible to observe light wavefronts after they pass through the whole concave lens 17.

Figure 14:
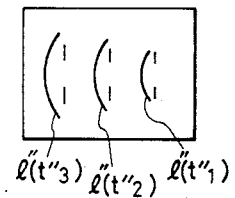
FIG. 14 is a schematic view of images of wavefronts recreated by the apparatus shown in FIG. 13.

FIG. 14 shows wavefronts appearing on the screen 10. Some portions of the wavefronts appearing on the screen 10 did not pass through the concave lens.

Figure 15:
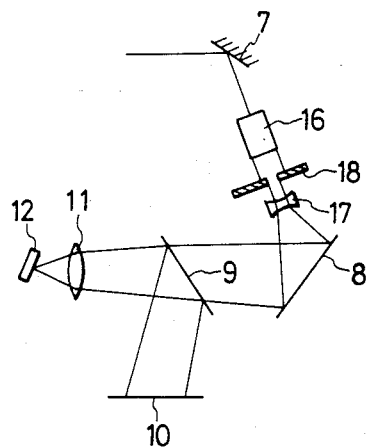
FIG. 15 is a schematic diagram of main portions of the apparatus according to the invention using a mask disposed between the beam expander and the concave lens.

FIG. 15 schematically shows main portions of another apparatus for observing wavefronts of light. This apparatus is similar in structure to the apparatus shown in FIG. 13. A mask 18 is disposed between the beam expander 16 and the concave lens 17 so as to conform to the shape of the lens 17, so that only light wavefronts which were transmitted through the concave lens 17 are observed.

In the examples described above, wavefronts of light are recreated on the screen 10. This screen may be a phosphor screen to observe phosphor images of wavefronts. When a single optical pulse is used, a phosphor screen is employed as the aforementioned screen 10 and monitored by a television for use in optical measurement, so that an image of wavefront can be observed with a trigger operation. It is also possible to repeatedly trigger a pulsed laser to produce a train of optical pulses. The phosphor screen is repeatedly excited to observe bright images. Further, it is possible to place the incident face of a camera tube or image intensifier at the position of the screen. In this case, wavefronts can be observed, using the output images or output signals.

Next, there will be described hereinafter embodiments of an apparatus for forming equidistant images from a three-dimensional object using a technique of observing light wavefronts as described above.

Figure 16:
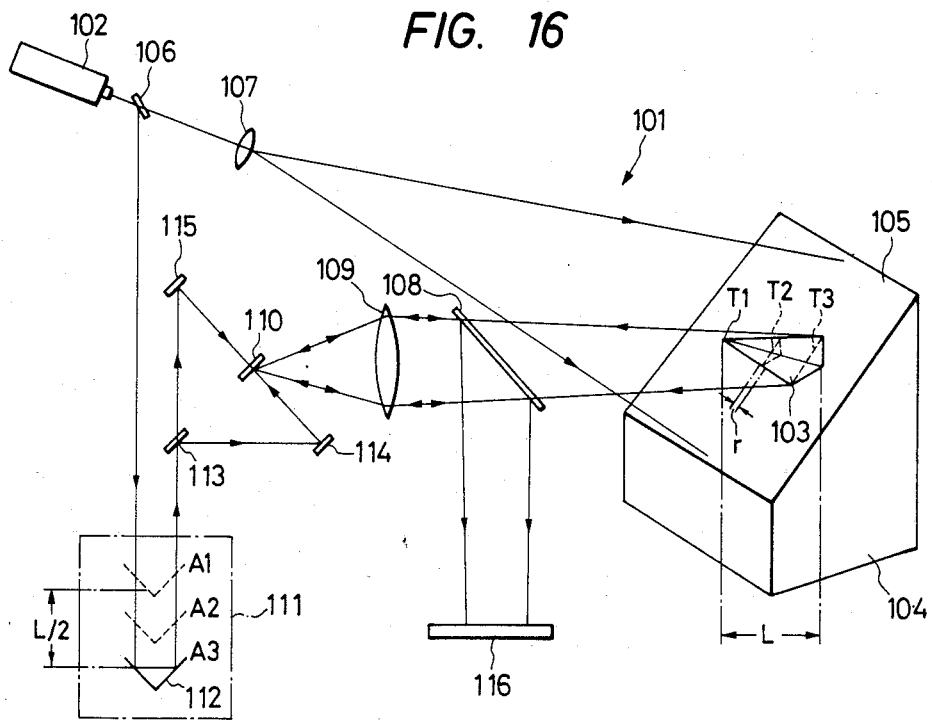
FIG. 16 is a diagram of an apparatus for observing equidistant images according to this invention.

FIG. 16 shows the structure of an embodiment of an apparatus according to the invention, the apparatus as shown in FIG. 16 being substantially similar to the apparatus for observing light wavefronts, except for an object. The apparatus, generally indicated by reference numeral 101, includes a laser 102 which produces laser pulses of a quite short duration of several picoseconds. A three-dimensional object, for example a pyramid 103, from which equidistant images should be taken are mounted on an inclined surface 105 of a mount 104. In this specific example, the mount 104 is rigidly fixed to a floor surface (not shown) and so the pyramid 103 does not move during observation of equidistant images.

A beam splitter 106 divides the laser beam from the laser 102 into two, one of which is used as an object beam and caused to strike the pyramid 103 on the mount 104 after passing through a lens 107. Then, the light is reflected by the pyramid 103, passes through a half mirror 108 and a lens 109 and enters a nonlinear optical element 110 made from a nonlinear medium. The other beam derived by the splitter 106 is employed as a reference beam and reflected by a movable mirror 112 incorporated in a variable light delay system 111. The reference beam then enters a half mirror 113, which divides the beam into two. These divided beams are caused to hit mirrors 114 and 115, respectively.

The mirrors 114 and 115 are so located that the two reference beams divided by the half mirror 113 propagate in opposite directions over the same optical length to the nonlinear optical element 110. The movable mirror 112 of the variable light delay system 111 can move a distance greater than approximately half the depth L of the pyramid 103 that is a three-dimensional object. This permits the optical path of the two reference beams incident upon the nonlinear optical element 110 to be made different from the optical path of the object beam.

Three beams are incident upon the nonlinear optical element 110 as mentioned previously. In particular, one incident beam is the object beam reflected by the pyramid 103. The remaining two are the reference beams which enter the element from opposite directions. The nonlinear optical element 110 comprises a nonlinear medium consisting of crystalline titanate barium or a thin film of eosin Y, or other dye. The incidence of the object beam and the two reference beams to the nonlinear optical element produces phase conjugate waves of the object beam by the four-wave mixing as described above.

In this case, only those object waves from the pyramid 103 which make optical-path differences less than the coherence length with the reference waves are reconstructed on a real-time basis and produced as the phase conjugate waves.

The phase conjugate waves produced by the nonlinear optical element 110 passes through the lens 109 and goes to the half mirror 108 along the incident geometrical path for object waves. Then, the conjugate waves are reflected by the half mirror 108 and reach the image pick-up device, such as a screen 116.

The screen 116 comprises a phosphor screen, the photosensitive surface of an image tube, or the like. The screen 116 permits one to observe with the naked eye image information contained in the phase conjugate waves as recreated images. Thus, images projected on the screen 116 are recreated from those object waves from the pyramid 103 which have substantially the same optical paths as the reference beam. Hence, two-dimensional images at positions taken in the direction of the depth of the pyramid 103, i.e., equidistant images, are projected on the screen 116 in the substantially same manner as described in the apparatus for observing light wavefront.

The apparatus 101 constructed as described above for observing equidistant images operates in the manner described below. First, the movable mirror 112 of the movable light delay system 111 is set at position A3. Under this condition, the optical path of the reference beam is equal to the optical path of the object beam reflected at the position T3 taken in the direction of the depth of the pyramid 103. As a result, only the phase conjugate waves of the object beam reflected at the position T3 are generated through the nonlinear optical element 110. Then, the conjugate waves pass through the lens 109, are reflected by the half mirror 108, and reach the screen 116, where a two-dimensional image at the position T3, i.e., an equidistant image C3, is projected as shown in FIG. 17.

Subsequently, the movable mirror 112 of the variable light delay system 111 is moved into the position A2 from the position A3. In this state, the optical path of the reference beam equals the optical path of the object beam reflected at the position T2. Consequently, only the phase conjugate waves of the object beams originating from the position T2 are generated by the nonlinear optical element 110 and projected on the screen 116. As shown in FIG. 17, an equidistant image C2 taken at the position T2 is projected on the screen 116.

Similarly, when the movable mirror 112 of the variable light delay system 111 is shifted from the position A2 to the position A1, the optical path of the reference beam is equal to the optical path of the object beam reflected at the position T1. As a result, an equidistant image C1 taken at the position T1 is project on the screen 116 as shown in FIG. 17.

Figure 17:
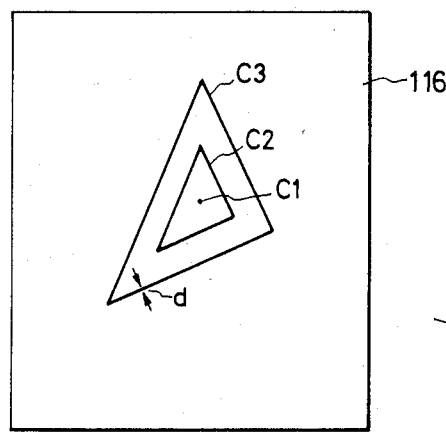
FIG. 17 shows equidistant images projected on a screen by the apparatus shown in FIG. 16.

Referring particularly to FIG. 17, the two-dimensional images at the positions T1, T2, T3 taken in the direction of the depth of the pyramid 103, i.e., the equidistant images C1, C2, C3 projected on the screen 116, have a bright line width d which is related to the coherence length of the laser beam emitted by the laser 102. More specifically, when the difference in optical path between reference and object laser beams is less than the coherence length, interference takes place. For example, for the equidistant image C2, the band the center of which is located at the position T2 and the width of which is a coherence length of r is projected on the screen 116. The projected band has a bright line width d. Accordingly, where a laser producing a laser beam having a long coherence length is used, the line width d is increased. This makes it impossible to accurately observe equidistant images taken at a certain position. In this apparatus, the laser 102 produces a laser beam having a duration of the order of several picoseconds, i.e., having a quite short coherence length, and so the line width d is quite small. Hence, equidistant images can be accurately observed.

As an example, if a CPM ring dye laser is used as the light source, the produced optical pulses have a duration of the order of 0.1 picosecond. Thus, it is possible to observe the change in the dimension taken in the direction of the depth up to approximately 30 μm.

In the first example described above, equidistant images can be projected on the screen 116 after the lapse of a quite short interval since the object beam from the pyramid 103 enters the nonlinear optical element 110. Also, it is only necessary to move the movable mirror 112 of the variable light delay system 111 to obtain equidistant images at positions taken in the direction of the depth. Therefore, these equidistant images can be accurately observed on a real-time basis by performing quite simple operations.

Figure 1A:
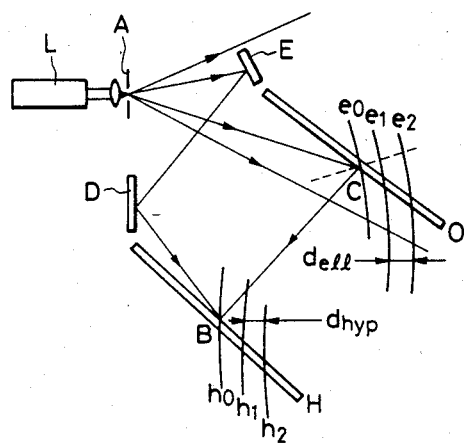
FIG. 1(A) is a schematic diagram of an apparatus for recording light wavefronts by holography and FIG. 1(B) is a schematic diagram showing the propagation of a wavefront along the surface of an object and a wavefront reflected by a mirror on the object.
Figure 1B:
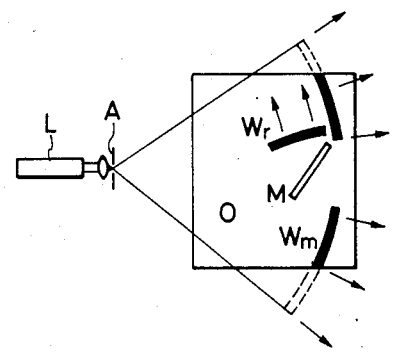
Figure 2A:
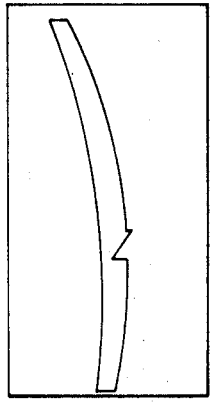
FIG. 2 is a view of light wavefronts observed by the apparatus shown in FIG. 1.
Figure 2B:
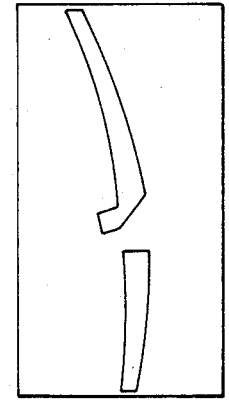
Figure 2C:
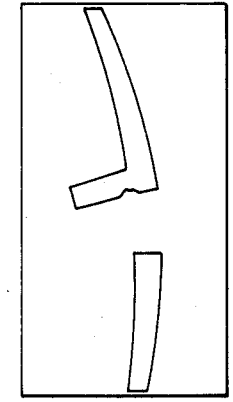
Figure 2D:
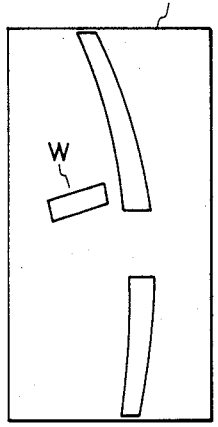
Figure 5:
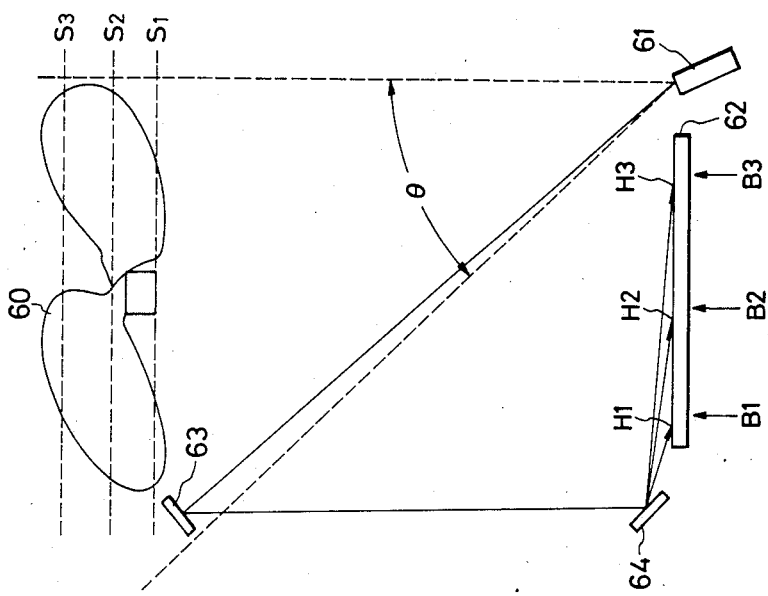
FIG. 5 is a diagram of the conventional apparatus for observing equidistant images utilizing holography technique.
Figure 3:
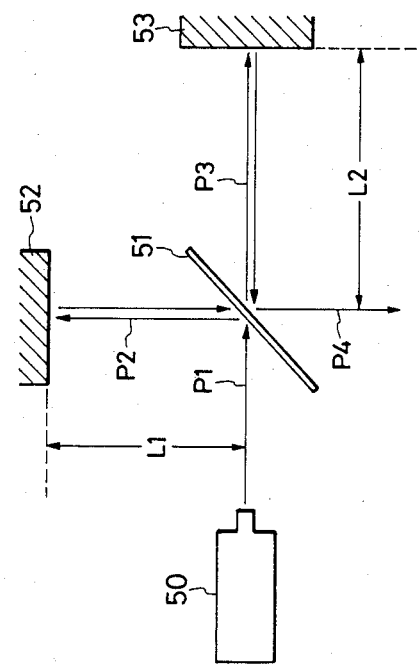
FIG. 3 is a diagram of a Michelson interferometer.
Figure 4:
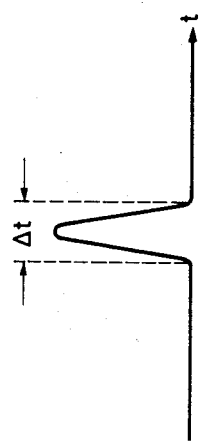
FIG. 4 is a diagram for illustrating the duration of a laser beam.
Figure 6A:
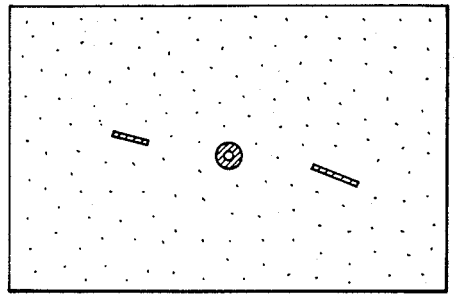
FIGS. 6(A) and 6(B) show equidistant images observed by the conventional apparatus shown in FIG. 5.
Figure 6B:
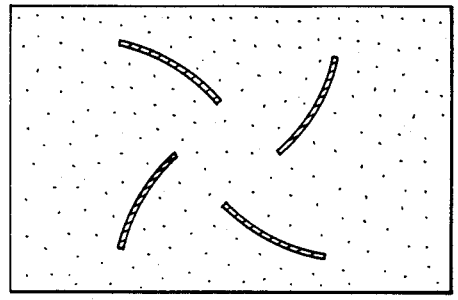
Figure 18:
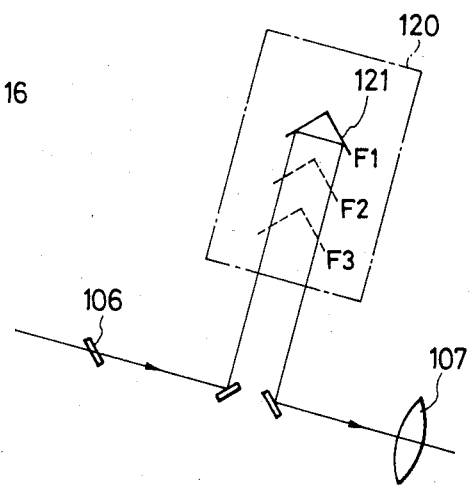
FIG. 18 is a diagram of a variable delay system installed in a geometrical path for an object beam.

It is also possible to install the variable light delay system in the geometrical path for the object beam, for example between the beam splitter 116 and the lens 107 as shown in FIG. 18, instead of in the geometrical path for the reference beam, in order to gradually vary the optical path of the object beam. In FIG. 18, when the movable mirror 121 of the variable light delay system 120 are set at positions F1, F2, F3, it is possible to observe equidistant images C1, C2, C3, respectively, at the positions T1, T2, T3 taken in the direction of the depth of the pyramid 103, on the screen 116 in exactly the same way as in FIG. 1. Further, the variable light delay system 111 and a second variable light delay system 120 may be installed in the geometrical paths for the reference beam and the object beam, respectively, to make their optical paths variable.

Figure 19A:
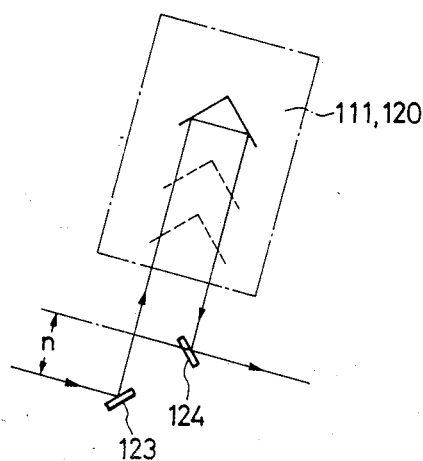
FIG. 19(A) is a diagram showing the arrangement of a variable delay system and mirrors, in which the geometrical path has vertically spaced portions.
Figure 19B:
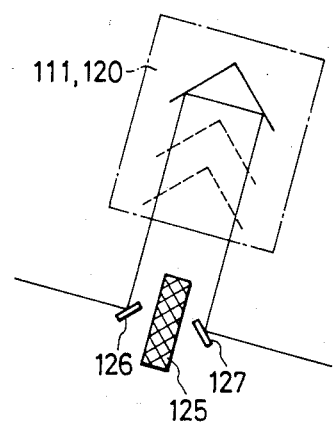
FIG. 19(B) is a diagram showing the arrangement of a variable delay system and mirrors, in which an obstacle exists in a geometrical path.

When the variable light delay systems 111 and 120 are installed in the geometrical path in this way, their optical paths can be changed. In addition, when the distance between the laser 102 and the three-dimensional object is large and it is difficult to control the position of the object, or when the object is heavy and difficult to move, the variable light delay systems are useful. In particular, the position of the three-dimensional object can be controlled simply by varying the optical path of the reference or object beam or the optical paths of both without the need to move the object itself. When one portion of the geometrical path for the reference or object beam is vertically spaced at a distance n from the remaining portion as shown in FIG. 19(A), or when an obstacle 125 exists in either geometrical path as shown in FIG. 19(B), the laser beam from the laser 102 can be correctly guided to a destination by the provision of the variable light delay systems 111 and 120 in the geometrical paths. In the system shown in FIG. 19(A), movable mirrors 123 and 124 reflect the laser beam which is either directed to the variable light delay systems 111 and 120 or transmitted through these light delay systems. The mirrors 123 and 124 are vertically spaced from each other thereby to easily and certainly guide the laser beam from the laser to a destination. In the system shown in FIG. 19(B), mirrors 126 and 127 are used so that the geometrical path may bypass the obstacle 125. Hence, the laser beam can be guided to a destination without being blocked by the obstacle 125.

Figure 20:
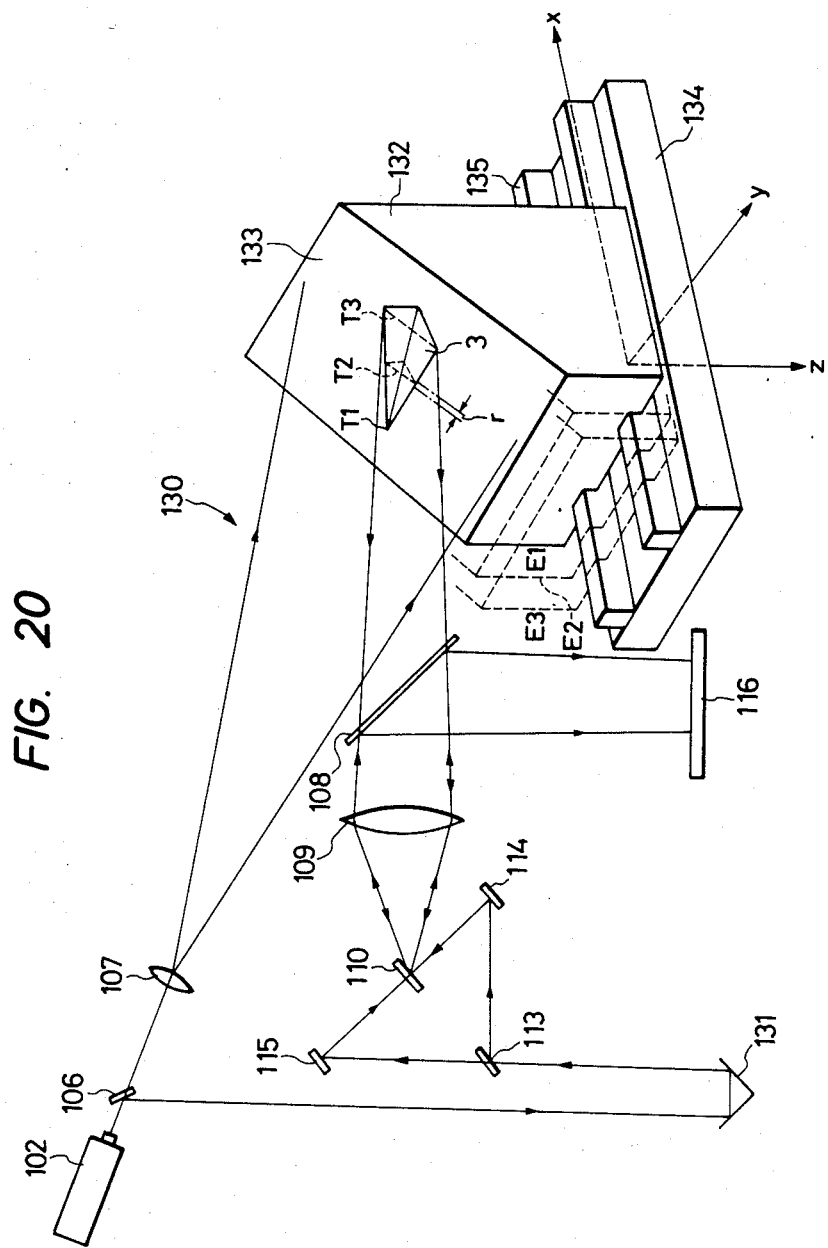
FIG. 20 is a diagram of another apparatus for observing equidistant images according to this invention.

FIG. 20 shows the structure of another apparatus according to the invention. It is to be noted that similar components are represented by same reference numerals in both FIGS. 16 and 20 and that those components which have been already described will not be described again below.

In the second example shown in FIG. 20, the apparatus for observing equidistant images is generally represented by numeral 130. A reference beam split off by a beam splitter 106 is reflected by a stationary mirror 131 and then directed into a nonlinear optical element 110 either via a half mirror 113 and a mirror 114 or via a mirror 115. Since the stationary mirror 131 is used, the optical path of the reference beam is kept constant.

A pyramid 103 that is a three-dimensional object is mounted on an inclined surface 133 of a mount 132, which is disposed so as to be slidable on rails 135 in the direction of the x-axis, the rails 135 being mounted on a base 134. When the mount 132 is slid along the rails 135, the pyramid 103 shifts in the direction of the x-axis to thereby vary the optical path of the object beam. The base 134 is designed to be rotatable about the y-axis and the z-axis. Therefore, the angle of the pyramid 103 to the laser beam incident upon the pyramid 103 can be varied.

In the apparatus 130 constructed in this way, the mount 132 is moved into a certain position on the rails 135 and held in this position. When the mount 132 is held in a position E3, the optical path of the object beam reflected at the position T3 is equal to the optical path of the reference beam. As a result, phase conjugate waves of the object beam from the position T3 are delivered from the nonlinear optical element 110, and an equidistant image similar to the image C3 shown in FIG. 17 is projected on a screen 116.

When the mount are held in positions E2 and E1 successively, the optical paths of the object beams reflected at positions T2 and T1, respectively, are equal to the optical path of the reference beam. Thus, equidistant images similar to the images C2 and C1, respectively, shown in FIG. 17 are successively projected on the screen 116. This permits one to observe the images.

The aforementioned operations are performed to observe equidistant images of the pyramid 103 taken in a certain direction. In some case, it is desired to observe equidistant images of the pyramid 103 taken in other directions. For this purpose, the base 134 is rotated about the y-axis or the z-axis or abut both axes to incline the pyramid 103 at a desired angle. Thereafter, the mount 132 is successively slid on the rails 135 into other positions to observe equidistant images at positions taken in the direction of the depth.

In the second example described above, the three-dimensional object is moved without shifting the component of the optical system, i.e., the movable mirrors 112 and 121 of the variable light delay systems 111 and 120. Therefore, the accuracy of the optical system does not deteriorate even if the apparatus is operated for a long period. This apparatus enables one to easily observe equidistant images stably and with improved accuracy on a real-time basis. Furthermore, not only equidistant images of a three-dimensional object taken in a certain direction but also equidistant images taken in any other direction can be observed simply by rotating the base 134.

As described above, in accordance with the present invention, only the object beam interfering with the reference beam within the nonlinear optical element is delivered in the form of phase conjugate waves. The light delay system enables the difference in optical path between the object beam and the reference beam incident upon the nonlinear optical element to be successively changed, so that light wavefronts are observed on a real-time basis to measure an optical characteristic such as aberration or the like of an object on a real-time basis, and so that using the light wavefront observing technique, two-dimensional images at positions taken in the direction of the depth of a three-dimensional object, i.e., equidistant images, can be observed on a real-time basis by performing quite simple operations.

What is claimed is:

1. An apparatus for optically analyzing an object using four-wave mixing technique comprising:
    a laser source for producing a pulse beam;
    a nonlinear optical element for producing a phase conjugate wave according to an incident beam thereon;
    a beam splitting means for splitting said pulse beam into first and second pulse beams and guiding said first and second pulse beams to said nonlinear optical element and said object, respectively;
    a first guide means for guiding said first pulse beam to enter said nonlinear optical element, said first pulse beam serving as a reference beam and being slit into two beams having the substantially same optical length, one entering said nonlinear optical element from a first direction and the other entering from a second direction opposite to said first direction;
    a second guide means for guiding said object beam from said object to enter said nonlinear optical element;
    an image observing means for forming an image of said phase conjugate wave from said nonlinear optical element; and
    a third guide means for projecting said phase conjugate wave from said nonlinear optical element on said image observing means, wherein said object beam has the substantially same optical length as said reference beam.

2. An apparatus as claimed in claim 1, said apparatus further comprising an optical delay means for optically delaying at least one of said reference beam and said object beam, and wherein said optical delay means is disposed in the propagating direction of at least one of said reference beam and said object beam.

3. An apparatus as claimed in claim 2, wherein said optical delay means comprises a movable mirror.

4. An apparatus as claimed in claim 1, wherein said beam splitting means comprises a beam splitter.

5. An apparatus as claimed in claim 1, wherein said first guide means comprises a half mirror for splitting said reference beam into said two beams and two reflecting mirrors for receiving and directing said two beams to said nonlinear optical element from the opposite directions to each other.

6. An apparatus as claimed in claim 1, wherein said second guide means comprises a reflecting surface for reflecting said object beam from said object toward said nonlinear optical element and a lens for converging said object beam from said reflecting surface, said reflecting surface being inclined at an arbitrary angle to the incident direction of said object beam to said reflecting surface.

7. An apparatus as claimed in claim 6, wherein said reflecting surface is a diffusing surface on a plane plate.

8. An apparatus as claimed in claim 1, wherein said third guide means comprises a half mirror for passing therethrough said object beam from said object, and reflecting said phase conjugate wave from said nonlinear optical element to said image observing means.

9. An apparatus as claimed in claim 1, wherein a beam expander is disposed between said beam splitting means and said object.

10. An apparatus as claimed in claim 9, wherein a mask for passing only object beam transmitted through said object is disposed between said object and said second guide means.

11. An apparatus as claimed in claim 1, wherein said image observing means comprises an image pickup device.

12. An apparatus as claimed in claim 1, wherein said image observing means comprises a phosphor screen.

13. An apparatus as claimed in claim 1, wherein said image observing means comprise a photosensitive surface of and image tube.

14. An apparatus as claimed in claim 1, wherein said pulse beam from said laser source has a duration of the order of several picoseconds.

15. An apparatus as claimed in claim 1, said apparatus further comprising a mounting plate for mounting said object thereon, said mounting plate being rotatable with two axis of rectangular three-dimensional coordinates and slidable along the remaining axis.

* * * * *